(12) United States Patent
Yoshida

(10) Patent No.: US 11,989,013 B2
(45) Date of Patent: May 21, 2024

(54) ABNORMALITY DETECTION APPARATUS, ABNORMALITY DETECTION SYSTEM, AND LEARNING APPARATUS, AND METHODS FOR THE SAME AND NON-TEMPORARY COMPUTER-READABLE MEDIUM STORING THE SAME

(71) Applicant: NEC Corporation, Tokyo (JP)

(72) Inventor: Kosuke Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 17/421,521

(22) PCT Filed: Jan. 18, 2019

(86) PCT No.: PCT/JP2019/001535
§ 371 (c)(1),
(2) Date: Jul. 8, 2021

(87) PCT Pub. No.: WO2020/148904
PCT Pub. Date: Jul. 23, 2020

(65) Prior Publication Data
US 2022/0083039 A1    Mar. 17, 2022

(51) Int. Cl.
*G05B 23/02* (2006.01)
*G06F 18/2132* (2023.01)
*G06N 3/04* (2023.01)

(52) U.S. Cl.
CPC ..... *G05B 23/0221* (2013.01); *G06F 18/2132* (2023.01); *G06N 3/04* (2013.01)

(58) Field of Classification Search
CPC ............ G05B 23/0221; G05B 23/0275; G06F 18/2132; G06N 3/04
See application file for complete search history.

(56) References Cited

U.S. PATENT DOCUMENTS

2017/0286864 A1\* 10/2017 Fiedel ................ G06N 20/00
2018/0181105 A1   6/2018 Shindou
(Continued)

FOREIGN PATENT DOCUMENTS

JP    2018-103284 A    7/2018
JP    2018-112852 A    7/2018
(Continued)

OTHER PUBLICATIONS

International Search Report for PCT Application No. PCT/JP2019/001535, dated Mar. 26, 2019.
(Continued)

*Primary Examiner* — Manuel L Barbee

(57) ABSTRACT

An abnormality detection apparatus (200) includes storage means (210) for storing a learned self-encoder (211) including predetermined number of two or more of elements as input layers, extraction means (220) for extracting a target data group of a predetermined period including data pieces from time series data measured by one or more sensors, the number of the data pieces being the predetermined number, conversion means (230) for converting the target data group into multi-dimensional vector data including the predetermined number of elements, identifying means (240) for identifying a time period in which there may be a cause of an abnormality from the predetermined period based on a difference between output vector data having the predetermined number of elements obtained by inputting the multi-dimensional vector data to the self-encoder (211) and the multi-dimensional vector data, and output means (250) for outputting abnormality detection information including the identified time period.

10 Claims, 12 Drawing Sheets

(56) References Cited

U.S. PATENT DOCUMENTS

2018/0365089 A1   12/2018  Okanohara et al.
2019/0197236 A1*  6/2019  Niculescu-Mizil ... G06F 21/554
2020/0213343 A1*  7/2020  Bharrat .................. G06N 3/045

FOREIGN PATENT DOCUMENTS

| JP | 2018-148350 A | 9/2018 |
| JP | 2020-077186 A | 5/2020 |
| WO | 2017/094267 A1 | 6/2017 |

OTHER PUBLICATIONS

Japanese Office Action for JP Application No. 2020-566085 dated May 24, 2022 with English Translation.

* cited by examiner

ABNORMALITY DETECTION APPARATUS, ABNORMALITY DETECTION SYSTEM, AND LEARNING APPARATUS, AND METHODS FOR THE SAME AND NON-TEMPORARY COMPUTER-READABLE MEDIUM STORING THE SAME

This application is a National Stage Entry of PCT/JP2019/001535 filed on Jan. 18, 2019, the contents of all of which are incorporated herein by reference, in their entirety.

TECHNICAL FIELD

The present disclosure relates to an abnormality detection apparatus, system, method, and program, and a learning apparatus, method, and program.

BACKGROUND ART

In today's complex systems, including manufacturing machinery, chemical plants, power plants, and mechanical components, a large number of sensors and various types of sensors are used for management. For example, in a power plant or the like, data of measurement values measured by as many as a few thousand sensors are output. Then, it is required to detect an abnormality of the system by analyzing output time series data and identify a cause of the abnormality.

Patent Literature 1 discloses a system for training a self-encoder using various data output from an information system and detecting an abnormality. The system is means for efficiently processing sensor data that often contains noise without requiring advanced expertise.

CITATION LIST

Patent Literature

Patent Literature 1: International Patent Publication No. WO2017/094267

SUMMARY OF INVENTION

Technical Problem

However, in Patent Literature 1, there is a problem that correlation between sensor values at different times is not considered, and thus the detection of an abnormality caused by a time axis is insufficient. Therefore, although in Patent Literature 1, it is possible to identify a sensor in which an abnormal value is measured at a certain time, it is not possible to detect, for example, a case in which an entire system is abnormal even if each sensor value within a predetermined period is a normal value, and thus the detection accuracy is insufficient.

An object of the present disclosure is to provide an abnormality detection apparatus, system, method, and program and a learning apparatus, method, and program for detecting an abnormality of a target system with higher accuracy using time series data obtained from a sensor.

Solution to Problem

A first example aspect of the present disclosure is an abnormality detection apparatus including:

storage means for storing a learned self-encoder including predetermined number of two or more of elements as input layers;

extraction means for extracting a target data group of a predetermined period including data pieces from time series data measured by one or more sensors, the number of the data pieces being the predetermined number;

conversion means for converting the target data group into multi-dimensional vector data including the predetermined number of elements;

identifying means for identifying a time period in which there may be a cause of an abnormality from the predetermined period based on a difference between output vector data having the predetermined number of elements obtained by inputting the multi-dimensional vector data to the self-encoder and the multi-dimensional vector data; and output means for outputting abnormality detection information including the identified time period.

A second example aspect of the present disclosure is an abnormality detection apparatus including:

storage means for storing a self-encoder including predetermined number of two or more of elements as input layers;

extraction means for extracting a target data group of a predetermined period including data pieces from time series data measured by one or more sensors, the number of the data pieces being the predetermined number;

conversion means for converting the target data group into multi-dimensional vector data including the predetermined number of elements;

learning means for inputting the multi-dimensional vector data to the input layer, learning a parameter of the self-encoder, and storing the self-encoder as a learned self-encoder in the storage means;

identifying means for identifying a time period in which there may be a cause of an abnormality from the predetermined period based on a difference between output vector data having the predetermined number of elements obtained by inputting the multi-dimensional vector data to the learned self-encoder and the multi-dimensional vector data; and output means for outputting abnormality detection information including the identified time period.

A third example aspect of the present disclosure is an abnormality detection method performed by a computer including:

extracting a target data group of a predetermined period including a predetermined number of two or more of data pieces from time series data measured by one or more sensors;

converting the target data group into multi-dimensional vector data including the predetermined number of elements;

identifying a time period in which there may be a cause of an abnormality from the predetermined period based on a difference between output vector data having the predetermined number of elements obtained by inputting the multi-dimensional vector data to the learned self-encoder including the predetermined number of elements as input layers and the multi-dimensional vector data; and outputting abnormality detection information including the identified time period.

A fourth example aspect of the present disclosure is a non-transitory computer readable medium storing an abnormality detection program which causes a computer to execute:

processing of extracting a target data group of a predetermined period including a predetermined number of two or more of data pieces from time series data measured by one or more sensors;

processing of converting the target data group into multi-dimensional vector data including the predetermined number of elements;

processing of identifying a time period in which there may be a cause of an abnormality from the predetermined period based on a difference between output vector data having the predetermined number of elements obtained by inputting the multi-dimensional vector data to the learned self-encoder including the predetermined number of elements as input layers and the multi-dimensional vector data; and processing of outputting abnormality detection information including the identified time period.

A fifth example aspect of the present disclosure is a learning apparatus including:

storage means for storing a self-encoder including predetermined number of two or more of elements as input layers;

extraction means for extracting a target data group of a predetermined period including data pieces from time series data measured by one or more sensors, the number of the data pieces being the predetermined number;

conversion means for converting the target data group into multi-dimensional vector data including the predetermined number of elements; and learning means for inputting the multi-dimensional vector data to the input layer, learning a parameter of the self-encoder, and storing the self-encoder as a learned self-encoder in the storage means.

A sixth example aspect of the present disclosure is a learning method performed by a computer including:

extracting a target data group of a predetermined period including a predetermined number of two or more of data pieces from time series data measured by one or more sensors;

converting the target data group into multi-dimensional vector data including the predetermined number of elements;

inputting the multi-dimensional vector data to a self-encoder including the predetermined number of elements as input layers and learning a parameter of the self-encoder; and storing the self-encoder as a learned self-encoder in a storage apparatus.

A seventh example aspect of the present disclosure is a learning program which causes a computer to execute:

processing of extracting a target data group of a predetermined period including a predetermined number of two or more of data pieces from time series data measured by one or more sensors;

processing of converting the target data group into multi-dimensional vector data including the predetermined number of elements;

processing of inputting the multi-dimensional vector data to a self-encoder including the predetermined number of elements as input layers and learning a parameter of the self-encoder; and processing of storing the self-encoder as a learned self-encoder in a storage apparatus.

Advantageous Effects of Invention

According to the above example aspects, it is possible to provide an abnormality detection apparatus, system, method, and program and a learning apparatus, method, and program for detecting an abnormality of a target system with higher accuracy using time series data obtained from a sensor.

DESCRIPTION OF EMBODIMENTS

Example embodiments of the present disclosure will now be described in detail with reference to the drawings. In each of the drawings, the same or corresponding elements are denoted by the same reference signs, and repeated descriptions are omitted as necessary for clarity of description.

First Example Embodiment

Figure 1:
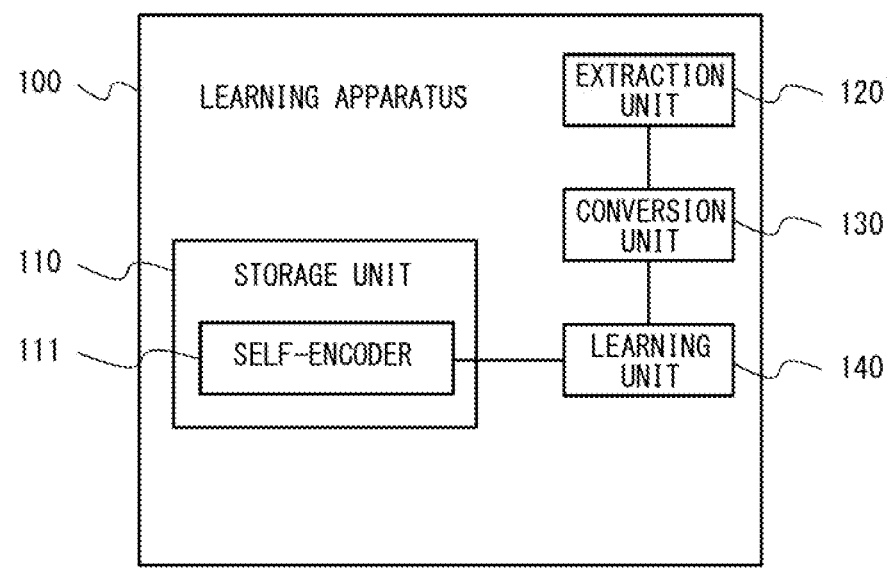
FIG. 1 is a block diagram showing a configuration of a learning apparatus according to a first example embodiment.

FIG. 1 is a block diagram showing a configuration of a learning apparatus 100 according to a first example embodiment. The learning apparatus 100 is an information processing apparatus for learning a parameter of a self-encoder used for detecting an abnormality of a target system. Here, the target system includes, but is not limited to, a manufacturing machine, a chemical plant, an electric power plant, and machine parts, as described above. For the target system, various measurements are made periodically or irregularly by a large number of sensors and various types of sensors, and measurement data are acquired. The learning apparatus 100 includes a storage unit 110, an extraction unit 120, a conversion unit 130, and a learning unit 140.

The storage unit 110 stores a self-encoder 111. The self-encoder 111 is a self-encoding model using predetermined number of two or more of elements as input layers. That is, the self-encoder 111 is a program module that inputs vector data having a predetermined number of dimensions, performs encoding to reduce the dimension from the vector data, and then performs processing to restore the original dimension. For example, the self-encoder 111 is a mathematical model calculated using a predetermined parameter (a weighting factor) for each input data. The self-encoder 111 is expressed by, for example, a neural network. As the self-encoder 111, for example, AE (Auto Encoder), VAE (Variational Auto Encoder), CVAE (Conditional Variational Auto Encoder) or the like can be employed. Furthermore, by learning the self-encoder 111 using the input data, an optimum parameter value can be obtained. The parameters of the self-encoder 111 may be those that have not yet been learned or already learned. In the following description, the term "predetermined number" refers to the number of elements in the input layer of the self-encoder used in the present disclosure.

The extraction unit 120 extracts a target data group of a predetermined period including a predetermined number of data pieces from time series data. The extraction unit 120 may acquire the time series data from an external or internal storage apparatus (not shown). Alternatively, the learning apparatus 100 may acquire the time series data from the outside in advance and store it in the storage unit 110 or the like. Here, the time series data is a set of two or more measured values (sensor data) measured from the target system by one or more sensors. Further, it is assumed that the time series data associates at least a (type of) measured sensor, a measured time, and a measured value with each other. When the number of sensors is two or more, the measurement intervals of the sensors may be different from each other. The "predetermined period" is a part of a period of the time series data and includes two or more measured times. Therefore, the target data group includes two or more (predetermined number of) data pieces corresponding to two or more measured times. However, the measured times in the target data group need not be adjacent to each other, and may be at least within the predetermined period. It is preferable that the time series data according to the first example embodiment be a data group measured in a normal state of the target system. That is, the time series data or the target data group according to this example embodiment can be regarded as data for learning by the self-encoder 111.

The conversion unit 130 converts the target data group into multi-dimensional vector data having a predetermined number of elements. That is, the number of elements of the input layer of the self-encoder 111, the number of data pieces of the extracted target data group, and the number of elements of the multi-dimensional vector data are all the same (and are) predetermined number of two or mores. Here, the conversion unit 130 may perform predetermined preprocessing on the target data group and then convert it into the multi-dimensional vector data.

The learning unit 140 inputs the multi-dimensional vector data converted by the conversion unit 130 to the input layer of the self-encoder 111, learns the parameters of the self-encoder 111, and stores the self-encoder 111 in the storage unit 110 as the learned self-encoder 111. For example, the learning unit 140 compares input data (the multi-dimensional vector data) input to the self-encoder 111 with a restored value of the input data by the self-encoder 111, and optimizes the parameters so that a difference between the input data and the restored value becomes small.

Figure 2:
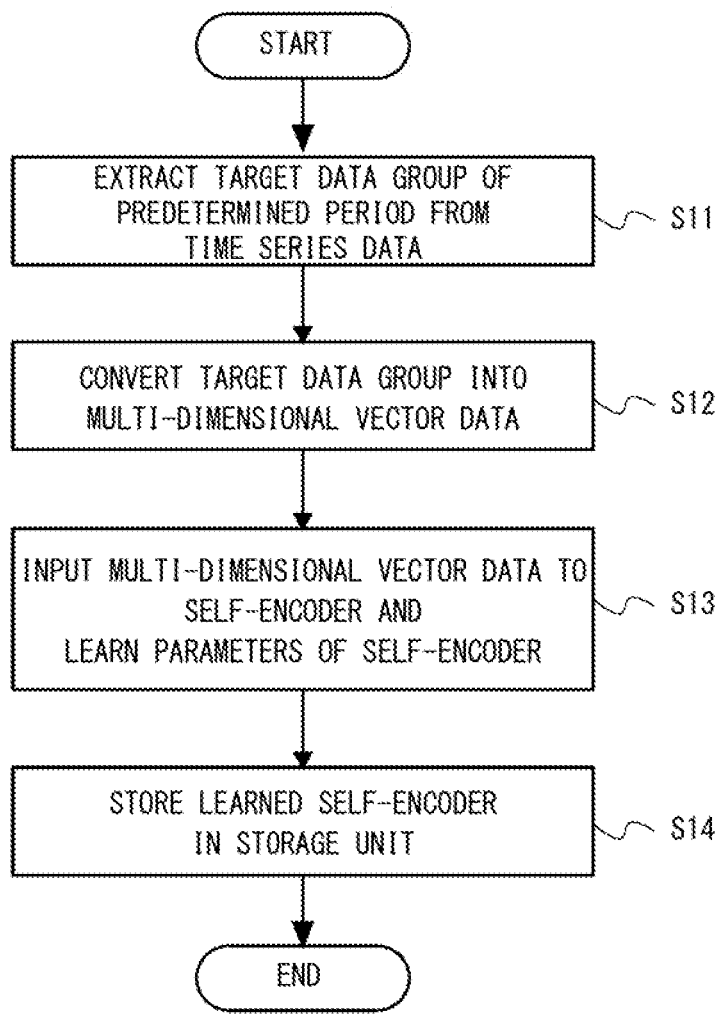
FIG. 2 is a flowchart showing a flow of a learning method according to the first example embodiment.

FIG. 2 is a flowchart showing a flow of a learning method according to the first example embodiment. First, the extraction unit 120 extracts the target data group of the predetermined period from the time series data for learning (S11). Next, the conversion unit 130 converts the target data group into the multi-dimensional vector data (S12). Then, the learning unit 140 inputs the multi-dimensional vector data converted in Step S12 to the input layer of the self-encoder 111, and learns the parameters of the self-encoder 111 (S13). After that, the learning unit 140 stores the learned self-encoder 111 in the storage unit 110 (S14).

As described above, in the first example embodiment, the parameters of the self-encoder are learned in every predetermined period including two or more measured times for the time series data obtained from the sensor, thereby obtaining the learned self-encoder. That is, observation data of a fixed time width among observation values of a plurality of sensors is converted into vector data in which the observation values are associated with respective elements of the input layer of the self-encoder. Then, by using the learned self-encoder, the abnormality of the target system can be detected with high accuracy. This is because, since the measurement data for the predetermined period including two or more measured times is used, an abnormal case that cannot be detected only by a threshold of a normal value of one data piece may be detected. For example, even if only a single piece of the measurement data is within the range of normal values, the following cases may be detected. The cases are, specifically, a case that is not normal when the relationship between adjacent data pieces or data at a plurality of points of time shows a specific pattern and a case in which an abnormal behavior is shown when the data is viewed along the time axis.

The learning apparatus 100 includes a processor, a memory, and a storage apparatus (not shown). The storage apparatus stores a computer program in which the processing of the learning method according to this example embodiment is implemented. The processor reads a computer program from the storage apparatus into the memory and executes the computer program. By doing so, the processor implements the functions of the extraction unit 120, the conversion unit 130, and the learning unit 140.

Alternatively, each of the extraction unit 120, the conversion unit 130, and the learning unit 140 may be implemented by dedicated hardware. Further, some or all of the constituent elements of each device may be implemented by general-purpose or dedicated circuitry, processors, etc., or a combination thereof. These constituent elements may be composed of a single chip or a plurality of chips connected via a bus. Some or all of the constituent elements of each device may be implemented by a combination of the circuitry, the program, and the like described above. The processor may be a CPU (Central Processing Unit), a GPU (Graphics Processing Unit), an FPGA (field-programmable gate array), or the like.

Further, when some or all of the constituent elements of the learning apparatus 100 are implemented by a plurality of information processing apparatuses, circuitry, etc., the plurality of information processing apparatuses, circuitry, and the like, may be collectively arranged or arranged separate from each other. For example, the information processing apparatus, the circuitry, and the like may be implemented as a form where they are connected to each other via a communication network, such as a client server system, a cloud computing system, and the like. Further, the function of the learning apparatus 100 may be provided in a SaaS (Software as a Service) format.

Second Example Embodiment

Figure 3:
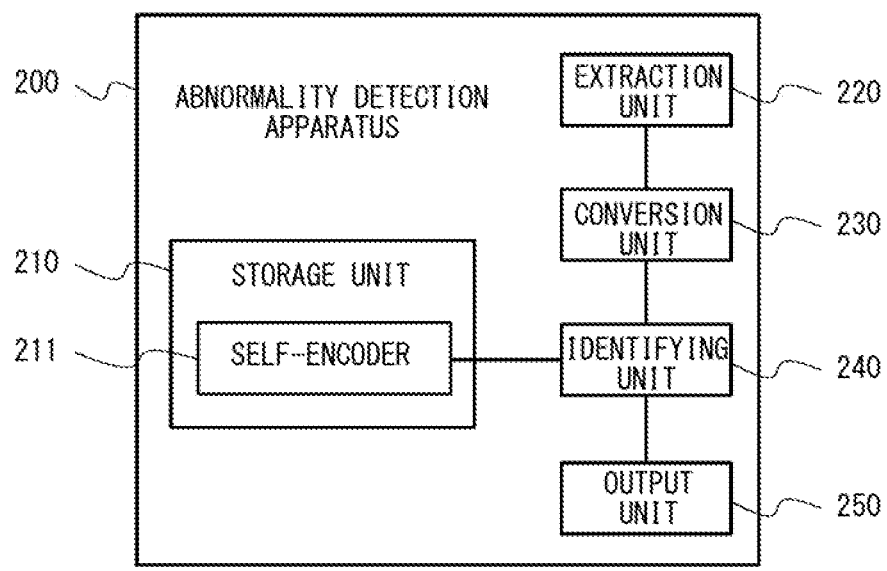
FIG. 3 is a block diagram showing a configuration of an abnormality detection apparatus according to a second example embodiment.

FIG. 3 is a block diagram showing a configuration of an abnormality detection apparatus 200 according to a second example embodiment. The abnormality detection apparatus 200 is an information processing apparatus for detecting an abnormality of the target system. Here, the target system is the same as that according to the first example embodiment. The abnormality detection apparatus 200 includes a storage unit 210, an extraction unit 220, a conversion unit 230, a identifying unit 240, and an output unit 250

The storage unit 210 stores a learned self-encoder 211. The self-encoder 211 is a self-encoding model using predetermined number of two or more of elements as input layers. It is assumed that the self-encoder 211 has learned the parameters in advance. Therefore, the learned self-encoder 111 according to the first example embodiment may be used as the self-encoder 211.

The extraction unit 220 extracts a target data group of a predetermined period including a predetermined number of data pieces from the time series data. The extraction unit 220 may have the same configuration as that of the extraction unit 120 described above. The time series data according to the second example embodiment may be actual operation data measured during an operation of the target system. That is, the time series data according to the second example embodiment includes data to be detected which is used for detecting an abnormality of the target system during the operation. As described above, the "predetermined number" refers to the number of elements in the input layer of the self-encoder.

The conversion unit 230 converts the target data group into multi-dimensional vector data having a predetermined number of elements. The conversion unit 230 may have the same configuration as that of the conversion unit 130 described above.

The identifying unit 240 inputs the multi-dimensional vector data to the self-encoder 211 to obtain output vector data. That is, the number of elements of the input layer of the self-encoder 211, the number of data pieces of the extracted target data group, the number of elements of the multi-dimensional vector data, and the number of elements of the output vector data are all the same (and are) predetermined number of two or mores. The identifying unit 240 identifies a time period in which there may be a cause of the abnormality within the predetermined period based on a difference between the output vector data and the multi-dimensional vector data used for input. Here, the "time period" may include at least one measured time.

The output unit 250 outputs abnormality detection information including the identified time period. Here, the "abnormality detection information" may include text data indicating that there may be the cause of the abnormality within the identified time period.

Figure 4:
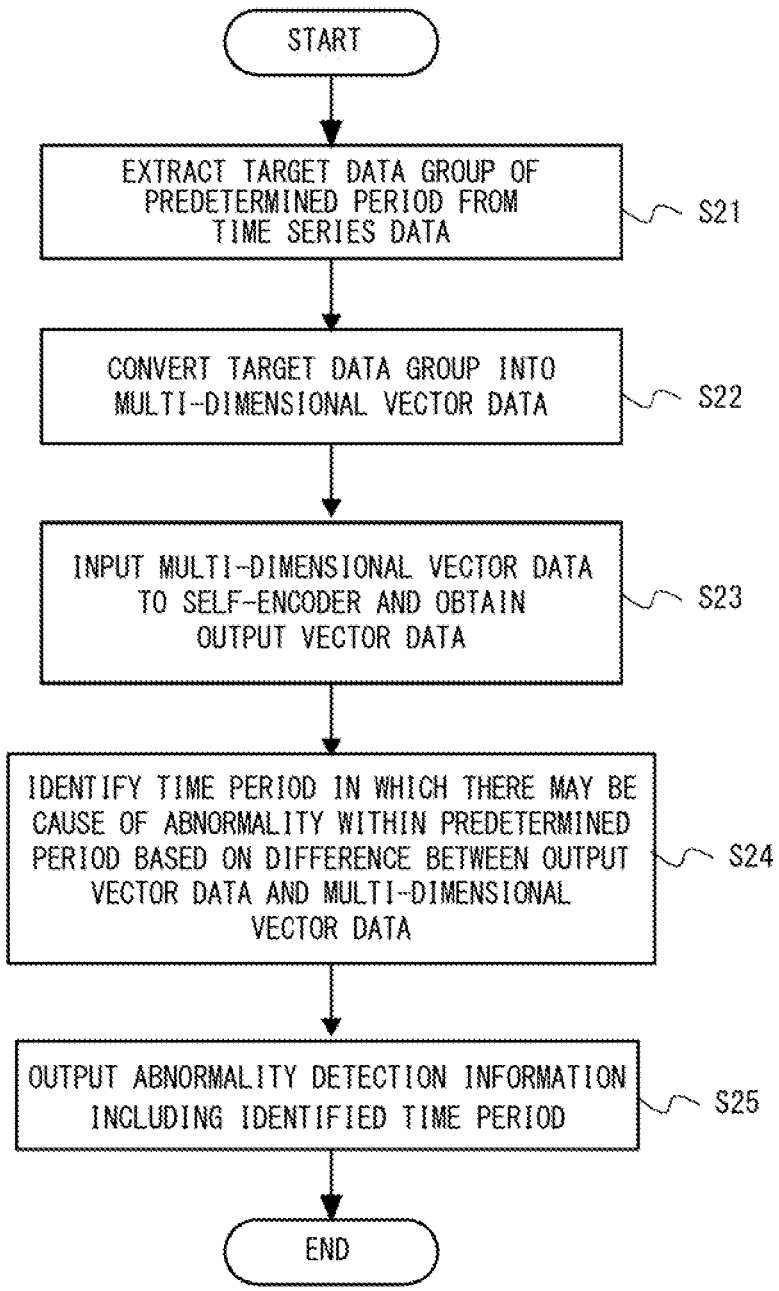
FIG. 4 is a flowchart showing a flow of an abnormality detection method according to the second example embodiment.

FIG. 4 is a flowchart showing a flow of an abnormality detection method according to the second example embodiment. First, the extraction unit 220 extracts the target data group of the predetermined period from the time series data (S21). Next, the conversion unit 230 converts the target data group into the multi-dimensional vector data (S22). Then, the identifying unit 240 inputs the multi-dimensional vector data converted in Step S22 to the learned self-encoder 211 to obtain the output vector data (S23). Then, the identifying unit 240 identifies the time period in which there may be the cause of the abnormality within the predetermined period based on the difference between the output vector data and the multi-dimensional vector data used for input (S24). After that, the output unit 250 outputs the abnormality detection information including the identified time period (S25).

In this way, according to the second example embodiment, the abnormality of the target system can be detected with high accuracy by using the time series data obtained from the sensor. This is because, an abnormal case that cannot be detected only by a threshold of a normal value of one data piece may be detected, because the measurement data for the predetermined period including two or more measured times is used. For example, even if only a single piece of the measurement data is within the range of normal values, the following cases may be detected. The cases are, specifically, a case that is not normal when the relationship between adjacent data pieces or data at a plurality of points of time shows a specific pattern and a case in which an abnormal behavior is shown when the data is viewed along the time axis. Therefore, the accuracy of detecting an unknown failure or abnormality is improved.

Here, in a rule-based method based on a certain threshold, which is a common method, it is necessary to determine abnormality detection rules in advance using domain knowledge for each abnormality. In order to establish a highly accurate abnormality detection rule, a high level of expertise is required for each domain. However, every time the target system is changed, new rules have to be established, and a complicated operation is required. For this reason, rule-based abnormality detection based on main knowledge has limitations.

On the other hand, in the abnormality detection apparatus 200 according to the second example embodiment, it is possible to improve the detection accuracy and identify a time at which there may be an abnormality without defining a rule. Therefore, it is possible to detect the abnormality in real time and to identify the cause of the abnormality even if there is no advanced expertise on complicated systems. This is because, in this example embodiment, observation values of a plurality of sensors having a fixed time width are vectorized.

The abnormality detection apparatus 200 includes a processor, a memory, and a storage apparatus (not shown). The storage apparatus stores a computer program in which the processing of the abnormality detection method according to this example embodiment is implemented.

The processor reads a computer program from the storage apparatus into the memory and executes the computer program. By doing so, the processor implements the functions of the extraction unit 220, the conversion unit 230, the identifying unit 240, and the output unit 250.

Alternatively, each of the extraction unit 220, the conversion unit 230, the identifying unit 240, and the output unit 250 may be implemented by dedicated hardware. Further, some or all of the constituent elements of each device may be implemented by general-purpose or dedicated circuitry, processors, etc., or a combination thereof. These constituent elements may be composed of a single chip or a plurality of chips connected via a bus. Some or all of the constituent elements of each device may be implemented by a combination of the circuitry, the program, and the like described above.

The processor may be a CPU (Central Processing Unit), a GPU (Graphics Processing Unit), an FPGA (field-programmable gate array), or the like.

Further, when some or all of the constituent elements of the abnormality detection apparatus 200 are implemented by a plurality of information processing apparatuses, circuitry, etc., the plurality of information processing apparatuses, circuitry, and the like, may be collectively arranged or arranged separate from each other. For example, the information processing apparatus, the circuitry, and the like may be implemented as a form where they are connected to each other via a communication network, such as a client server system, a cloud computing system, and the like. Further, the function of the abnormality detection apparatus 200 may be provided in a SaaS (Software as a Service) format.

Third Example Embodiment

Figure 5:
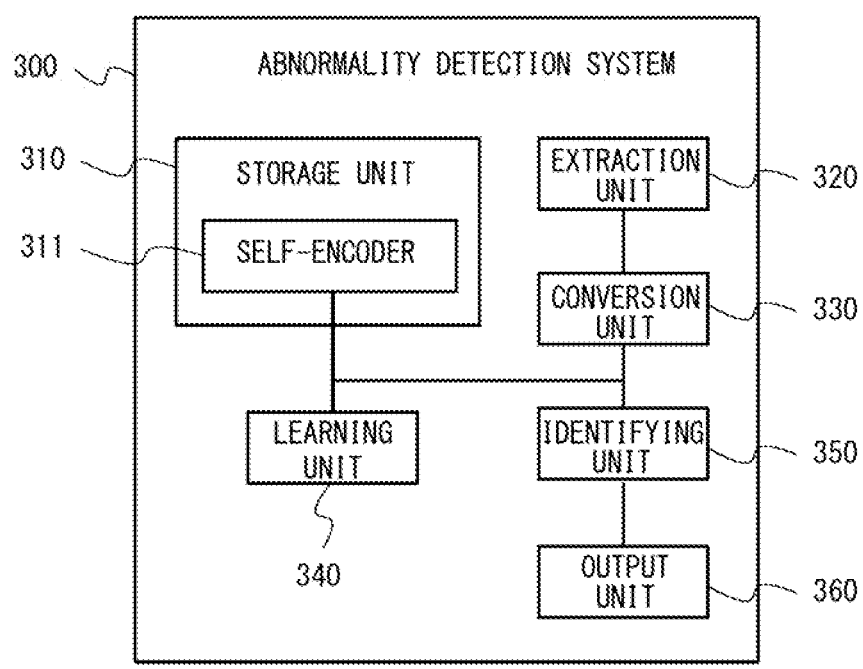
FIG. 5 is a block diagram showing a configuration of an abnormality detection system according to a third example embodiment.

FIG. 5 is a block diagram showing a configuration of an abnormality detection system 300 according to a third example embodiment. The abnormality detection system 300 is an information processing system having the functions of the learning apparatus 100 and the abnormality detection apparatus 200. Note that the same configuration may be used for overlapping functions of the learning apparatus 100 and the abnormality detection apparatus 200 described above. Further, the abnormality detection system 300 may be implemented by distributing functions or making the functions redundant by two or more computer apparatuses. The abnormality detection system 300 includes a storage unit 310, an extraction unit 320, a conversion unit 330, a learning unit 340, a identifying unit 350, and an output unit 360.

The storage unit 310 has a configuration at least equivalent to that of the storage unit 110 or the storage unit 210. The storage unit 310 stores a self-encoder 311. The self-encoder 311 is a self-encoding model that has not yet been learned or already learned, and the self-encoder 111 or 211 described above may be used as the self-encoder 311.

The extraction unit 320 has a configuration at least equivalent to that of the extraction unit 120 or the extraction unit 220. The conversion unit 330 has a configuration at least equivalent to that of the conversion unit 130 or the conversion unit 230. The learning unit 340 has a configuration at least equivalent to that of the learning unit 140. The identifying unit 350 has a configuration at least equivalent to that of the identifying unit 240. The output unit 360 has a configuration at least equivalent to that of the output unit 250.

The third example embodiment further has at least one of the following configurations. First, the "predetermined period" is a time period in which a combination of the sensor and the measured time measured by the sensor becomes a "predetermined number". It is preferable that the conversion unit convert the target data group into the multi-dimensional vector data having, as an element, each data of a combination of the sensor and the measured time measured by the sensor. Further, the identifying unit may compare the output vector data with the multi-dimensional vector data for each corresponding element to calculate the difference between the output vector data and the multi-dimensional vector data, and identify the time period including the measured time when the difference exceeds a predetermined threshold.

The time series data includes the data measured at a plurality of measured times measured by each of two or more sensors. The identifying unit further identifies a sensor in which there may be a cause of the abnormality from among the two or more sensors based on the difference. In this case, the output unit includes the identified time period and the identified sensor in association with each other in the abnormality detection information and then outputs the abnormality detection information.

Figure 6:
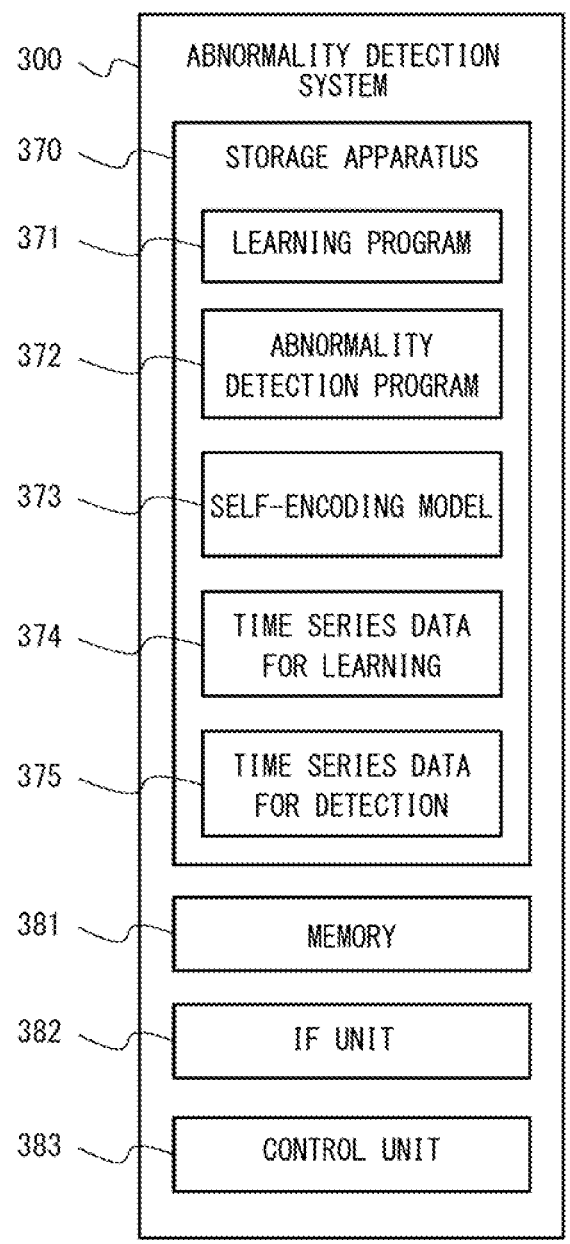
FIG. 6 is a block diagram showing a hardware configuration of the abnormality detection system according to the third example embodiment.

FIG. 6 is a block diagram showing a hardware configuration of the abnormality detection system 300 according to the third example embodiment. FIG. 6 schematically shows a case where the abnormality detection system 300 is implemented by one information processing apparatus. As described above, the abnormality detection system 300 may be implemented by distributing functions or making the functions redundant by two or more information processing apparatuses.

The abnormality detection system 300 includes at least a storage apparatus 370, a memory 381, an IF (InterFace) unit 382, and a control unit 383. The storage apparatus 370 is a storage apparatus such as a hard disk, a flash memory or the like corresponding to the storage unit 310 described above. The storage apparatus 370 stores a learning program 371, an abnormality detection program 372, a self-encoding model 373, time series data for learning 374, time series data for detection 375, etc. The learning program 371 is a computer program in which learning processing of the self-encoder according to this example embodiment is implemented. The abnormality detection program 372 is a computer program in which the abnormality detection processing according to this example embodiment is implemented. The self-encoding model 373 corresponds to the self-encoder 311 described above, and has not yet been learned or already learned. The time series data for learning 374 is used as input data for learning processing and corresponds to the time series data according to the first example embodiment. In particular, the time series data for learning 374 is preferably a data group measured in a normal state of the target system. The time series data for detection 375 is used as input data for the abnormality detection processing and corresponds to the time series data according to the second example embodiment.

The memory 381 is a volatile storage apparatus such as a RAM (Random Access Memory) and is a storage area for temporarily holding information during an operation of the control unit 383. The IF unit 382 is an interface for performing input/output with the outside of the abnormality detection system 300. For example, the IF unit 382 receives a user's operation via an input device (not shown) such as a keyboard, a mouse, and a touch panel, and outputs the received operation contents to the control unit 383. In response to an instruction from the control unit 383, the IF unit 382 outputs data to the touch panel, a display apparatus, a printer, or the like (not shown).

The control unit 383 is a processor, i.e., a control apparatus, for controlling each configuration of the abnormality detection system 300, and is, for example, a CPU. The control unit 383 reads the learning program 371 and the abnormality detection program 372 from the storage apparatus 370 into the memory 381, and executes the learning program 371 and the abnormality detection program 372. By doing so, the control unit 383 implements the functions of the extraction unit 320, the conversion unit 330, the learning unit 340, the identifying unit 350, and the output unit 360.

Figure 7:
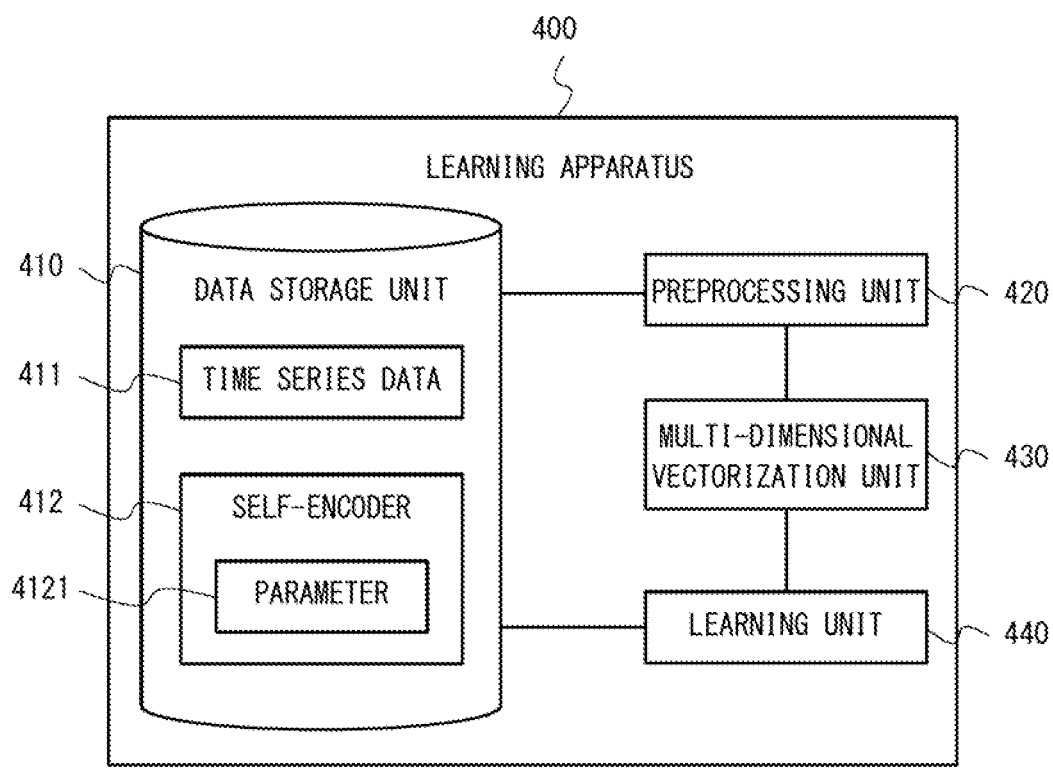
FIG. 7 is a block diagram showing a configuration of a learning apparatus according to the third example embodiment.

Hereinafter, an aspect of the abnormality detection system 300 according to the third example embodiment as a learning apparatus will be described. FIG. 7 is a block diagram showing a configuration when the abnormality detection system 300 according to the third example embodiment is regarded as a learning apparatus 400. The learning apparatus 400 includes a data storage unit 410, a preprocessing unit 420, a multi-dimensional vectorization unit 430, and a learning unit 440. The data storage unit 410 has a configuration equivalent to that of the storage unit 310 described above. The data storage unit 410 stores time series data 411 and a self-encoder 412. The time series data 411 corresponds to the learning time series data 374. The self-encoder 412 includes a parameter 4121. The parameter 4121 may be a random value or a setting value before learning.

The preprocessing unit 420 smoothes the time series data 411 and outputs the smoothed data as preprocessed data. By performing the preprocessing, a self-encoder more robust against noise can be obtained. Specific examples of the preprocessing will be described later. The preprocessed data may be regarded as the above-described time series data.

The multi-dimensional vectorization unit 430 extracts data from the preprocessed data in a fixed time width (a unit of a predetermined period), and multi-dimensionally vectorizes the extracted preprocessed data in time series. Here, it is assumed that the predetermined period is predetermined based on the number of sensor types of the time series data 411 and the measurement interval at which each sensor measures. For example, the predetermined period may be a time period in which the number of combinations between each sensor and the measured time measured by the sensor becomes the number of elements of the input layer of the self-encoder 412. Note that the time width can be set freely depending on the application. The number of dimensions of the multi-dimensional vector data is the number of elements when each data for each combination of the sensor and the measured time measured by the sensor is regarded as one element. That is, the multi-dimensional vectorization unit 430 converts the preprocessed data into the multi-dimensional vector data having the number of dimensions in which each data for each combination of the sensor and the measured time measured by the sensor is regarded as one element.

The learning unit 440 learns the parameter 4121 of the self-encoder 412 using the multi-dimensional vector data converted by the multi-dimensional vectorization unit 430. That is, the learning unit 440 inputs the multi-dimensional vector data to the self-encoder 412 and acquires a restored value. The learning unit 440 optimizes the parameter 4121 so that a difference between the input multi-dimensional vector data and the restored value becomes small. Then, the learning unit 440 updates the data storage unit 410 by the optimized parameter 4121. As the learning algorithm of the parameters of the self-encoder, a known algorithm such as an backpropagation method can be used.

Figure 8:
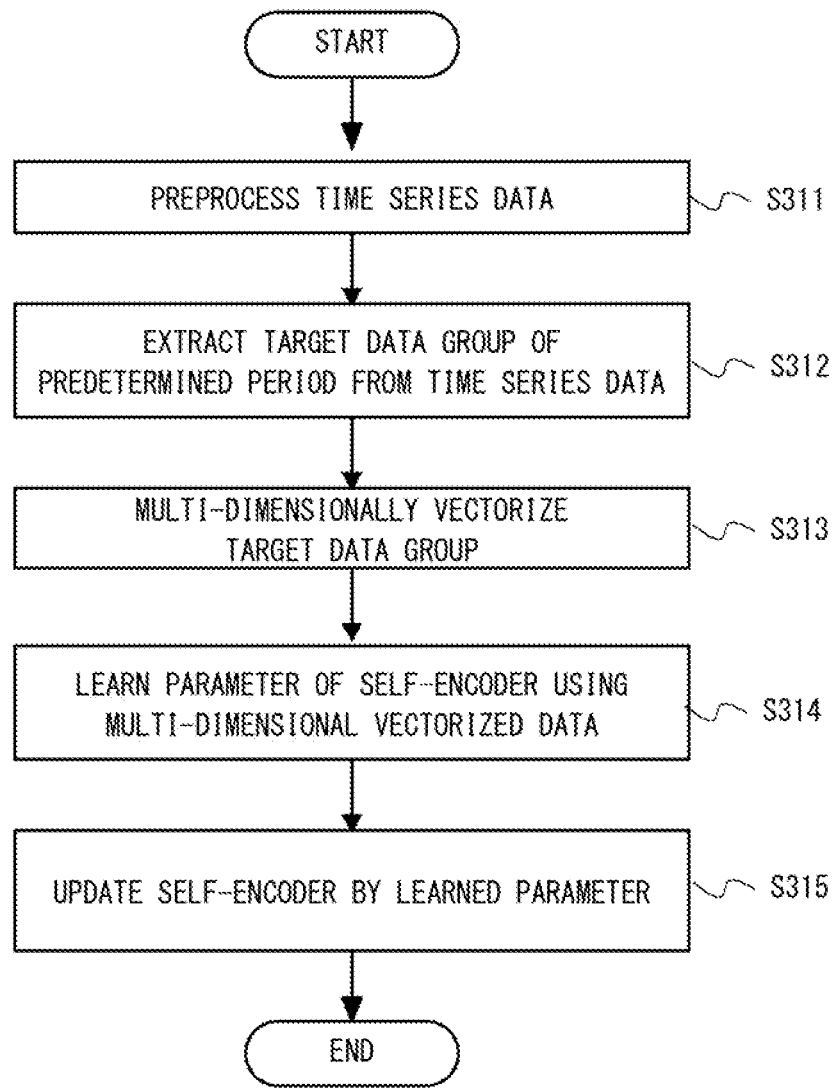
FIG. 8 is a flowchart showing a flow of processing in a learning stage according to the third example embodiment.

FIG. 8 is a flowchart showing a flow of processing in a learning stage according to the third embodiment. First, the preprocessing unit 420 performs predetermined preprocessing on the time series data 411 stored in the data storage unit 410 (S311). For example, it is preferable that the preprocessing unit 420 performs smoothing to previously remove minute noise. Alternatively, the preprocessing unit 420 may perform Fourier transformation to extract a specific frequency component. Specific methods of the preprocessing are not limited to them.

Next, the multi-dimensional vectorization unit 430 extracts a target data group of the predetermined period from the preprocessed time series data (S312). Then, the multi-dimensional vectorization unit 430 multi-dimensionally vectorizes the extracted target data group (S313).

Then, the learning unit 440 learns the parameter 4121 of the self-encoder 412 using the multi-dimensional vectorized data (S314). Then, the learning unit 440 stores the learning result in the data storage unit 410 (S315).

As described above, in the third example embodiment, in a manner similar to the first example embodiment, it is possible to obtain the learned self-encoder for detecting the abnormality of the target system with higher accuracy using the time series data obtained from the sensor.

Figure 9:
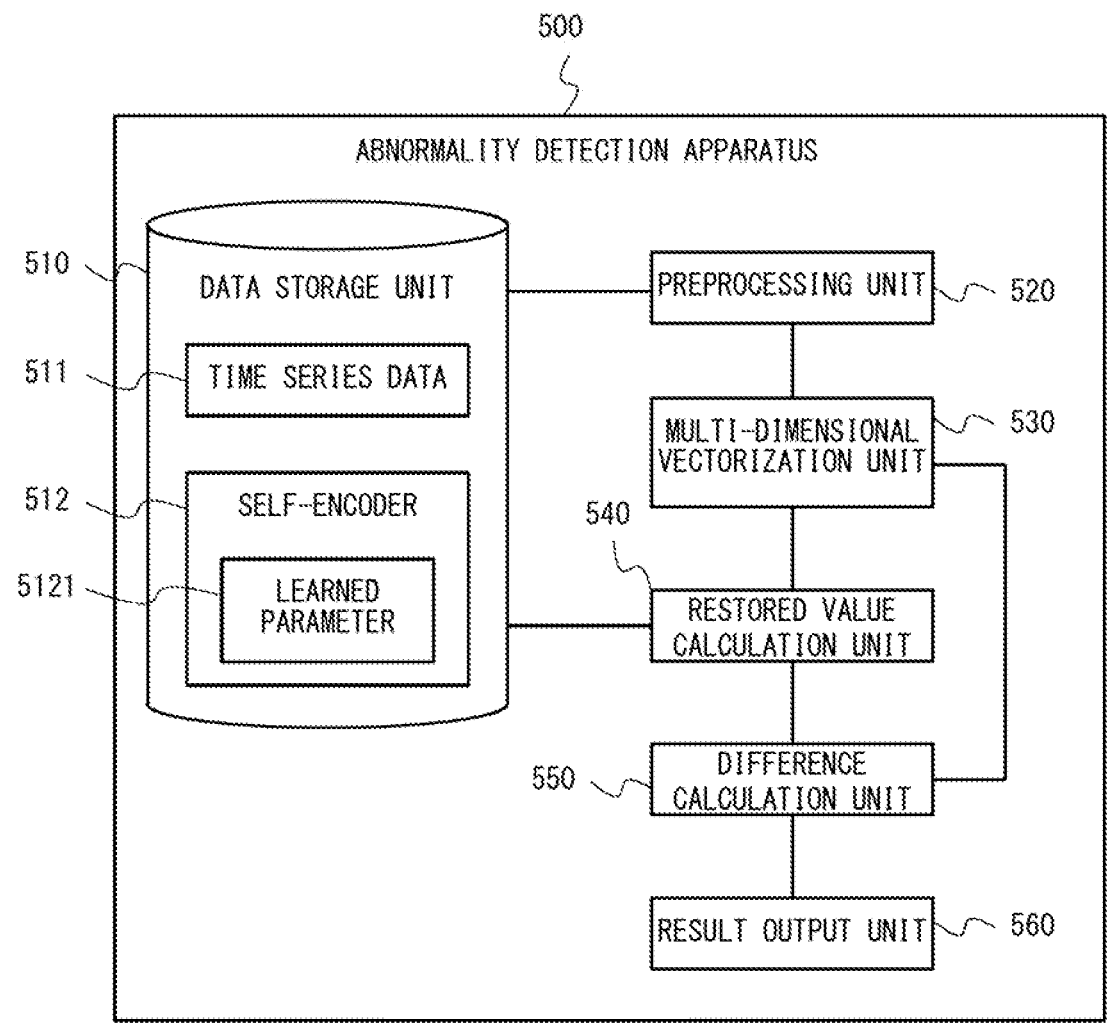
FIG. 9 is a block diagram showing a configuration of the abnormality detection apparatus according to the third example embodiment.

Next, a case where the abnormality detection system 300 is functioning as an abnormality detection apparatus will be described. FIG. 9 is a block diagram showing a configuration when the abnormality detection system 300 according to the third example embodiment is regarded as an abnormality detection apparatus 500. The abnormality detection apparatus 500 includes a data storage unit 510, a preprocessing unit 520, a multi-dimensional vectorization unit 530, a restored value calculation unit 540, a difference calculation unit 550, and a result output unit 560. The data storage unit 510 has a configuration equivalent to that of the storage unit 310 described above. The data storage unit 510 stores time series data 511 and a self-encoder 512. The time series data 511 corresponds to the time series data for detection 375, and may be stored as measured from the target system at any time. The self-encoder 512 includes a learned parameter 5121. That is, the self-encoder 512 and the learned parameter 5121 may be the self-encoder 412 and the parameter 4121, respectively, learned by the learning apparatus 400.

Since the preprocessing unit 520 and the multi-dimensional vectorization unit 530 perform the same processing as that of the preprocessing unit 420 and the multi-dimensional vectorization unit 430, respectively, detailed description of the preprocessing unit 520 and the multi-dimensional vectorization unit 530 is omitted.

The restored value calculation unit 540 inputs the multi-dimensional vector data converted by the multi-dimensional vectorization unit 430 to the self-encoder 512, calculates the restored value by the self-encoder 512, and acquires the restored value as the output vector data. At this time, the self-encoder 512 calculates the restored value from the input multi-dimensional vector data using the learned parameter 5121.

The difference calculation unit 550 calculates a deviation between the restored value and the input multi-dimensional vector data for each sensor, each measured time, or each sensor and measured time as the difference between the restored value and the input multi-dimensional vector data.

The result output unit 560 identifies the sensor, the time period, or a set of the sensor and the time period in which there may be a cause of an abnormality based on the difference calculated by the difference calculation unit 550. The result output unit 560 generates the abnormality detection information using the identified time period or the like, and outputs the generated abnormality detection information to the outside of the abnormality detection apparatus 500. For example, the result output unit 560 displays the abnormality detection information on the display or the like.

Here, it is assumed that the abnormality detection apparatus 500 has previously stored in the data storage unit 510 one or more indexes for identifying the time period or the like in which there may be the cause of the abnormality. Examples of the index include an individual threshold indicating a threshold of an allowable difference for each sensor and measured time, an upper limit number of times that the individual threshold is allowed to be exceeded within the predetermined period, a threshold of a statistical processing result (standard deviation, etc.) of the difference, an allowable degree of a positive or negative variation of the difference, and the like. However, the index is not limited to these. Therefore, the result output unit 560 may identify a plurality of measured times or relevant sensors in which the difference exceeds the individual threshold within the predetermined period based on the difference and the index.

Alternatively, the result output unit 560 may identify the time period or the sensor in which the difference exceeding the individual threshold exceeds the upper limit number of times within the predetermined period based on the difference and the index. Further alternatively, the result output unit 560 may perform statistical processing on the difference based on the difference and the index, and identify the time period or the like in which there may be the cause of the abnormality based on the statistical processing result such as a variation. Further alternatively, the result output unit 560 may derive a positive or negative variation of the difference based on the difference and the index, and identify the time period or the like in which the difference exceeds the allowable degree. As a result, it is possible to detect an abnormality that cannot be detected by the measurement data alone at individual measured times.

Figure 10:
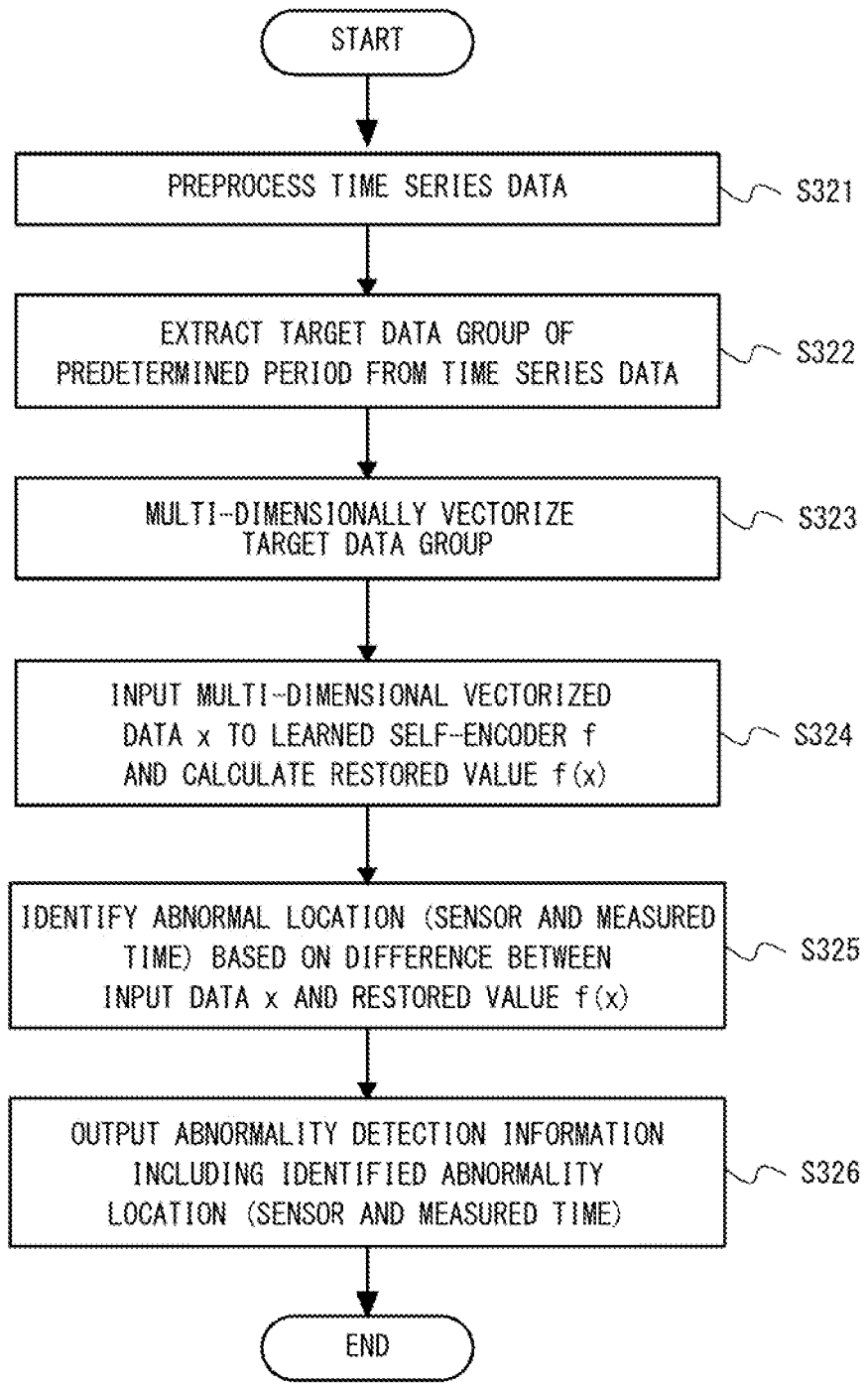
FIG. 10 is a flowchart showing a flow of processing in an abnormality detection stage according to the third example embodiment.

FIG. 10 is a flowchart showing a flow of processing in an abnormality detection stage according to the third example embodiment. First, the preprocessing unit 520 performs predetermined preprocessing on the time series data 511 stored in the data storage unit 510, in a manner similar to the above-described Step S311 (S321). As described above, the time series data 511 corresponds to the time series data for detection 375. Next, the multi-dimensional vectorization unit 530 extracts, from the preprocessed time series data, the target data group corresponding to the predetermined period in a manner similar to the above-described Step S312 (S322). Then, the multi-dimensional vectorization unit 530 multi-dimensionally vectorizes the extracted target data group in the same manner as in the above-described Step S313 (S323).

After that, the restored value calculation unit 540 inputs the multi-dimensional vectorized data x to the learned self-encoder 512(f), and calculates the restored value f(x) (S324). Then, the result output unit 560 identifies an abnormal location (the sensor and measured time) based on the difference between the input data x and the restored value f(x) (S325). After that, the result output unit 560 generates the abnormality detection information including the identified abnormality location and then outputs it (S326).

Here, in the above-mentioned target system, there is a case where an abnormality is observed not as the sensor value itself of each measured time but as a time-series pattern over some period. For example, individual values may be within the normal range but vibrate that cannot be seen at normal times, or may vary rapidly. Therefore, it is not sufficient to manage the sensor value at each time. In addition, it is necessary to identify a timing of the occurrence of the abnormality so that the timing can be used to investigate the cause of the abnormality in more detail.

Thus, according to the third example embodiment, as in the second example embodiment, the abnormality of the target system can be detected with higher accuracy using the time series data obtained from the sensor. Further, in the third example embodiment, since the sensor is also identified together with the time period in which there may be an abnormality to be used as the abnormality detection information, an administrator can identify the cause of the abnormality in a short period of time using more detailed detection information.

The time series data according to the third example embodiment may include measurement results at two or more measured times measured by at least one or more sensors. The predetermined period may include two or more measured times. In this case, the self-encoder 311 according to the third example embodiment can use the following configuration.

Figure 11:
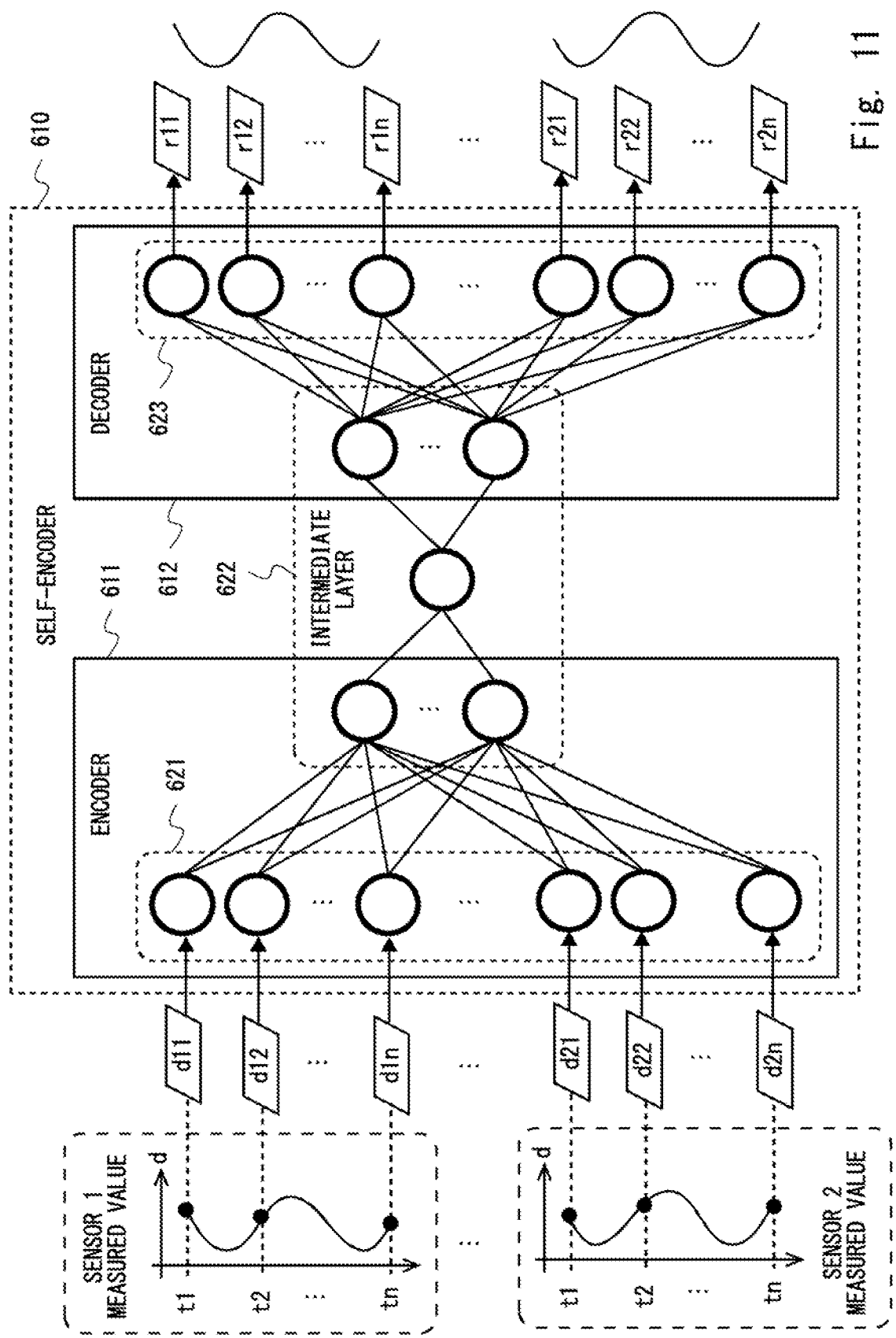
FIG. 11 is a diagram for explaining a concept of a self-encoder using a fully-connected neural network according to the third example embodiment.

FIG. 11 is a diagram for explaining a concept of a self-encoder 610 using the fully-connected neural network according to the third example embodiment. The self-encoder 610 includes an encoder 611 and a decoder 612. The encoder 611 is a fully-connected neural network in which elements of the input layer 621 are connected in a round robin fashion. The decoder 612 is coupled to the encoder 611 and includes an output layer 623 having the same number of elements as that of the input layer 621. The input layer 621 and the output layer 623 are coupled to each other with a plurality of intermediate layers 622 interposed therebetween. The parameters 4121 and 5121 described above are weighting coefficients used for calculation between elements (neurons) of different layers. The number of the intermediate layers 622 is not limited to three and instead may be four or more.

Here, for example, it is assumed that the sensor data is measured at the time corresponding to the time series data by the sensors 1 and 2. The predetermined period is defined as a period from a measured time t1 to a measured time tn (n is a natural number greater than or equal to two). Then, the preprocessing unit 420 (520) and the multi-dimensional vectorization unit 430 (530) preprocess and extract sensor data d11 to d1n and d21 to d2n corresponding to measured times t1 to tn, respectively, from the time series data and multi-dimensionally vectorize them. The learning unit 440 or the restored value calculation unit 540 inputs the sensor data d11 to d1n and d21 to d2n to respective elements of the input layer 621 of the self-encoder 610. The encoder 611 outputs the data from the input layer 621 to the intermediate layers 622 using the parameters, and the decoder 612 outputs the data from the intermediate layers 622 to the output layer 623 using the parameters. Therefore, the self-encoder 610 reduces, by the encoder 611, the dimension from the multi-dimensional vector data having the sensor data d11 to d1n and d21 to d2n as elements, restores the dimension by the decoder 612, and outputs the restored data r11 to r1n and r21 to r2n. Therefore, since the dimension of the input data d11 to d2n is the same as the dimension of the output data r1n to r2n of the self-encoder 610, the data can be compared with each other for each corresponding sensor and each measured time to obtain a difference between the input data and the output data. Here, by using a fully-connected neural network such as the self-encoder 610, it is possible to consider the relationship between different sensors and between different measured times, thereby improving the accuracy of abnormality detection.

Fourth Example Embodiment

A fourth example embodiment is a modified example of the third example embodiment described above, and uses a self-encoder in which an input layer is separated for each sensor. Thus, since the number of parameters of the self-encoder is smaller than that of the third example embodiment, a learning processing time and an abnormality detection processing time can be shortened. Note that the configuration of the fourth example embodiment other than the above configuration is the same as that of the third example embodiment, and thus the drawing and detailed description of the configuration of the fourth example embodiment are omitted.

Figure 12:
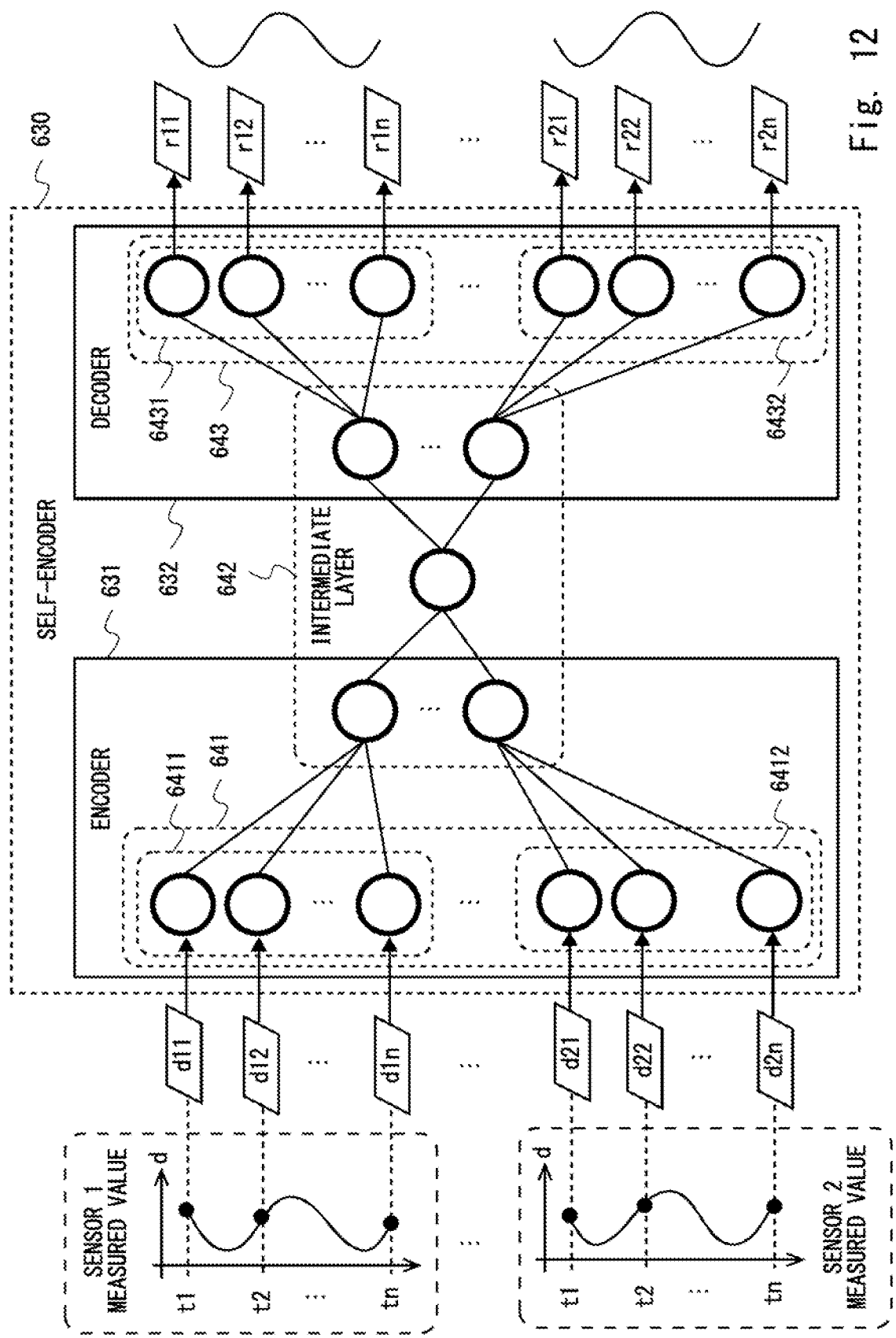
FIG. 12 is a diagram for explaining a concept of a self-encoder using a neural network with branches according to a fourth example embodiment.

FIG. 12 is a diagram for explaining a concept of a self-encoder 630 using a neural network with branches according to the fourth example embodiment. The self-encoder 630 includes an encoder 631 and a decoder 632. The encoder 631 includes a plurality of sub-input layers 6411, . . . 6412 and so on corresponding to two or more sensors 1, . . . sensors 2 and so on respectively. Note that the sub-input layers 6411, . . . 6412 and so on can be regarded as the input layer 641. The decoder 632 includes a plurality of sub-output layers 6431, . . . 6432 and so on corresponding to the sub-input layers 6411, . . . , 6412 and so on, respectively. Note that the sub-output layers 6431, . . . 6432 and so on can be regarded as the output layer 643. The input layer 641 and the output layer 643 are coupled to each other with a plurality of intermediate layers 642 interposed therebetween. The number of the intermediate layers 642 is not limited to three and instead may be four or more.

Here, the sub-input layer 6411 is coupled to some of the elements in the preceding layers of the intermediate layers 642, and is not coupled to any other elements. Further, the sub-input layer 6412 is coupled to elements of the preceding layers of the intermediate layers 642 different from the elements coupled to the sub-input layer 6411, and is not coupled to any other element. Likewise, the sub-output layer 6431 is coupled to some of the elements in the subsequent layers of the intermediate layers 642, and is not coupled to any other elements. Further, the sub-output layer 6432 is coupled to elements of the subsequent layers of the intermediate layers 642 different from the elements coupled to the sub-output layer 6431, and is not coupled to any other element.

Therefore, the learning unit 440 or the restored value calculation unit 540 inputs the sensor data d11 to d1$n$ among the multi-dimensional vector data to respective elements of the sub-input layer 6411 corresponding to the sensor 1 in the self-encoder 630. Likewise, the learning unit 440 or the restored value calculation unit 540 inputs the sensor data d21 to d2$n$ among the multi-dimensional vector data to respective elements of the sub-input layer 6412 corresponding to the sensor 2 in the self-encoder 630. The encoder 631 outputs the data from the sub-input layers 6411 and 6412 to the intermediate layers 642 using the parameters, and the decoder 632 outputs the data from the intermediate layer 642 to the sub-output layers 6431 and 6432 using the parameters. At this time, the decoder 632 outputs, from the sub-output layer 6431, restored the data r11 to r1$n$ corresponding to the sensor data d11 to d1$n$ of the sensor 1, and outputs from, the sub-output layer 6432, the restored data r21 to r2$n$ corresponding to the sensor data d21 to d2$n$ of the sensor 2. Therefore, the self-encoder 630 reduces, by the encoder 631, the dimension from the multi-dimensional vector data having the sensor data d11 to d1$n$ and d21 to d2$n$ as elements, restores the dimension by the decoder 632, and outputs the restored data r11 to r1$n$ and r21 to r2$n$. Therefore, since the dimension of the input data d11 to d2$n$ is the same as the dimension of the output data r1$n$ to r2$n$ of the self-encoder 630, the data can be compared with each other for each corresponding sensor and each measured time to obtain a difference between the input data and the output data. Here, by using a neural network in which an input layer is branched by a sensor such as the self-encoder 630, the number of parameters is reduced as compared with a fully-coupled neural network, so that the learning processing time and the abnormality detection processing time can be shortened.

Other Example Embodiments

A self-encoder according to this example embodiment is not limited to the neural network shown in FIG. 11 or 12. For example, the self-encoder according to this example embodiment may be a convolutional neural network.

A target system according to this example embodiment includes, for example, a turbine of a power plant. In this case, the sensor includes a pressure gauge and a temperature system, and the sensor data (measured value) are, for example, pressure and temperature. Then, an abnormal case such as abnormal pressure rise or vibration at a specific place can be detected.

In the above example embodiments, each element shown in the drawings as a functional block for performing various processes can be composed of a CPU (Central Processing Unit), a memory, or other circuits in terms of hardware, and can be implemented by a program or the like which is loaded into the memory and executed by the CPU in terms of software. It will thus be understood by those skilled in the art that these functional blocks may be implemented in a variety of ways, either hardware only, software only, or a combination thereof.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Noted that the present disclosure is not limited to the above-described example embodiments, and may be modified as appropriate without departing from the scope. Further, the present disclosure may be implemented by appropriately combining the respective example embodiments.

The whole or part of the exemplary embodiments disclosed above can be described as, but not limited to, the following supplementary notes.

(Supplementary Note A1)

An abnormality detection apparatus comprising:

storage means for storing a learned self-encoder including predetermined number of two or more of elements as input layers;

extraction means for extracting a target data group of a predetermined period including data pieces from time series data measured by one or more sensors, the number of the data pieces being the predetermined number;

conversion means for converting the target data group into multi-dimensional vector data including the predetermined number of elements;

identifying means for identifying a time period in which there may be a cause of an abnormality from the predetermined period based on a difference between output vector data having the predetermined number of elements obtained by inputting the multi-dimensional vector data to the self-encoder and the multi-dimensional vector data; and output means for outputting abnormality detection information including the identified time period.

(Supplementary Note A2)

The abnormality detection apparatus according to Supplementary note A1, wherein
the predetermined period is a time period in which the number of combinations of the sensor and a measured time measured by the sensor becomes the predetermined number.

(Supplementary Note A3)

The abnormality detection apparatus according to Claim A1 or A2, wherein
the conversion means converts the target data group into the multi-dimensional vector data including each data of a combination of the sensor and the measured time measured by the sensor as the element.

(Supplementary Note A4)

The abnormality detection apparatus according to any one of Claims A1 to A3, wherein
the identifying means compares the output vector data with the multi-dimensional vector data for each corresponding element and calculates the difference, and
the identifying means identifies the time period including the measured time when the difference exceeds a predetermined threshold.

(Supplementary Note A5)

The abnormality detection apparatus according to any one of Claims A1 to A4, wherein
the time series data includes data measured at a plurality of the measured times measured by each of two or more sensors,
the identifying means further identifies the sensor in which there may be the cause of the abnormality from among the two or more sensors based on the difference, and
the output means includes the identified time period with the identified sensor in association with each other in the abnormality detection information and outputs the abnormality detection information.

(Supplementary Note A6)

The abnormality detection apparatus according to any one of Claims A1 to A5, wherein
the self-encoder includes an encoder which is a fully-connected neural network in which elements of the input layer are connected in a round robin fashion.

(Supplementary Note A7)

The abnormality detection apparatus according to Claim A5, wherein
the self-encoder comprises:
an encoder including a plurality of sub-input layers corresponding to the two or more sensors, respectively; and
a decoder coupled to the encoder and includes a plurality of sub-output layers corresponding to the plurality of sub-input layers, respectively,
each of the plurality of sub-input layers includes each data corresponding to the plurality of measured times measured by the corresponding sensor as the element, and
each of the plurality of sub-output layers includes the same number of the elements as that of the elements of the sub-input layer.

(Supplementary Note A8)

The abnormality detection apparatus according to any one of Supplementary notes A1 to A7, wherein
the extraction means extracts a second target data group of the predetermined period from second time series data measured by the one or more sensors when a measuring target is normal,
the conversion means converts the second target data group into second multi-dimensional vector data, and
the abnormality detection apparatus further comprises learning means for inputting the second multi-dimensional vector data to the input layer, learning the parameter of the self-encoder, and storing the self-encoder as the learned self-encoder in the storage means.

(Supplementary Note B1)

A learning apparatus comprising:
storage means for storing a self-encoder including a predetermined number of two or more elements as input layers;
extraction means for extracting a target data group of a predetermined period including data pieces from time series data measured by one or more sensors, the number of the data pieces being the predetermined number;
conversion means for converting the target data group into multi-dimensional vector data including the predetermined number of elements; and
learning means for inputting the multi-dimensional vector data to the input layer, learning a parameter of the self-encoder, and storing the self-encoder as a learned self-encoder in the storage means.

(Supplementary Note B2)

The learning apparatus according to Claim B1, wherein
the predetermined period is a time period in which the number of combinations of the sensor and a measured time measured by the sensor becomes the predetermined number.

(Supplementary Note C1)

An abnormality detection system comprising:
storage means for storing a self-encoder including predetermined number of two or more elements as input layers;
extraction means for extracting a target data group of a predetermined period including data pieces from time series data measured by one or more sensors, the number of the data pieces being the predetermined number;
conversion means for converting the target data group into multi-dimensional vector data including the predetermined number of elements;
learning means for inputting the multi-dimensional vector data to the input layer, learning a parameter of the self-encoder, and storing the self-encoder as a learned self-encoder in the storage means;
identifying means for identifying a time period in which there may be a cause of an abnormality from the predetermined period based on a difference between output vector data having the predetermined number of elements obtained by inputting the multi-dimensional vector data to the learned self-encoder and the multi-dimensional vector data; and
output means for outputting abnormality detection information including the identified time period.

(Supplementary Note C2)

The abnormality detection system according to Claim C1, wherein
the predetermined period is a time period in which the number of combinations of the sensor and a measured time measured by the sensor becomes the predetermined number.

(Supplementary Note D1)

An abnormality detection method performed by a computer comprising:

extracting a target data group of a predetermined period including a predetermined number of two or more of data pieces from time series data measured by one or more sensors;

converting the target data group into multi-dimensional vector data including the predetermined number of elements;

identifying a time period in which there may be a cause of an abnormality from the predetermined period based on a difference between output vector data having the predetermined number of elements obtained by inputting the multi-dimensional vector data to the learned self-encoder including the predetermined number of elements as input layers and the multi-dimensional vector data; and outputting abnormality detection information including the identified time period.

(Supplementary Note E1)

A learning method performed by a computer comprising:

extracting a target data group of a predetermined period including a predetermined number of two or more of data pieces from time series data measured by one or more sensors;

converting the target data group into multi-dimensional vector data including the predetermined number of elements;

inputting the multi-dimensional vector data to a self-encoder including the predetermined number of elements as input layers and learning a parameter of the self-encoder; and storing the self-encoder as a learned self-encoder in a storage apparatus.

(Supplementary Note F1)

An abnormality detection program which causes a computer to execute:

processing of extracting a target data group of a predetermined period including a predetermined number of two or more of data pieces from time series data measured by one or more sensors;

processing of converting the target data group into multi-dimensional vector data including the predetermined number of elements;

processing of identifying a time period in which there may be a cause of an abnormality from the predetermined period based on a difference between output vector data having the predetermined number of elements obtained by inputting the multi-dimensional vector data to the learned self-encoder including the predetermined number of elements as input layers and the multi-dimensional vector data; and processing of outputting abnormality detection information including the identified time period.

(Supplementary Note G1)

A learning program which causes a computer to execute:

processing of extracting a target data group of a predetermined period including a predetermined number of two or more of data pieces from time series data measured by one or more sensors;

processing of converting the target data group into multi-dimensional vector data including the predetermined number of elements;

processing of inputting the multi-dimensional vector data to a self-encoder including the predetermined number of elements as input layers and learning a parameter of the self-encoder; and processing of storing the self-encoder as a learned self-encoder in a storage apparatus.

Although the present disclosure has been described above with reference to the example embodiments (and Examples), the present disclosure is not limited to the embodiments (and Examples). The configuration and details of the present disclosure may be modified in various ways that would be understood by those skilled in the art within the scope of the present disclosure.

REFERENCE SIGNS LIST

100 LEARNING APPARATUS
110 STORAGE UNIT
111 SELF-ENCODER
120 EXTRACTION UNIT
130 CONVERSION UNIT
140 LEARNING UNIT
200 ABNORMALITY DETECTION APPARATUS
210 STORAGE UNIT
211 SELF-ENCODER
220 EXTRACTION UNIT
230 CONVERSION UNIT
240 IDENTIFYING UNIT
250 OUTPUT UNIT
300 ABNORMALITY DETECTION SYSTEM
310 STORAGE UNIT
311 SELF-ENCODER
320 EXTRACTION UNIT
330 CONVERSION UNIT
340 LEARNING UNIT
350 IDENTIFYING UNIT
360 OUTPUT UNIT
370 STORAGE APPARATUS
371 LEARNING PROGRAM
372 ABNORMALITY DETECTION PROGRAM
373 SELF-ENCODING MODEL
374 TIME SERIES DATA FOR LEARNING
375 TIME SERIES DATA FOR DETECTION
381 MEMORY
382 IF UNIT
383 CONTROL UNIT
400 LEARNING APPARATUS
410 DATA STORAGE UNIT
411 TIME SERIES DATA
412 SELF-ENCODER
4121 PARAMETER
420 PREPROCESSING UNIT
430 MULTI-DIMENSIONAL VECTORIZATION UNIT
440 LEARNING UNIT
500 ABNORMALITY DETECTION APPARATUS
510 DATA STORAGE UNIT
511 TIME SERIES DATA
512 SELF-ENCODER
5121 PARAMETER
520 PREPROCESSING UNIT
530 MULTI-DIMENSIONAL VECTORIZATION UNIT
540 RESTORED VALUE CALCULATION UNIT
550 DIFFERENCE CALCULATION UNIT
560 RESULT OUTPUT UNIT
610 SELF-ENCODER
611 ENCODER
612 DECODER
621 INPUT LAYER
622 INTERMEDIATE LAYER
623 OUTPUT LAYER
630 SELF-ENCODER
631 ENCODER
632 DECODER

641 INPUT LAYER
6411 SUB-INPUT LAYER
6412 SUB-INPUT LAYER
642 INTERMEDIATE LAYER
643 OUTPUT LAYER
6431 SUB-OUTPUT LAYER
6432 SUB-OUTPUT LAYER
d11 SENSOR DATA
d12 SENSOR DATA
d1n SENSOR DATA
d21 SENSOR DATA
d22 SENSOR DATA
d2n SENSOR DATA
r11 RESTORED DATA
r12 RESTORED DATA
r1n RESTORED DATA
r21 RESTORED DATA
r22 RESTORED DATA
r2n RESTORED DATA
t1 MEASURED TIME
t2 MEASURED TIME
tn MEASURED TIME

What is claimed is:

1. An abnormality detection apparatus comprising:
at least one memory configured to store instructions and a learned self-encoder, the learned self-encoder including a predetermined number of two or more elements as input layers, and
at least one processor configured to execute the instructions to:
extract, from time series data measured by one or more sensors during a first period of time, a target data group including a number of data pieces equal to the predetermined number of the elements of the learned self-encoder, the target data group being for a predetermined period of time which is at least part of the first period;
convert the target data group into multi-dimensional vector data having a number of elements equal to the predetermined number of elements of the learned self-encoder;
input the multi-dimensional vector data to the self-encoder to obtain output vector data having a number of elements equal to the predetermined number of elements of the learned self-encoder;
identify a time period in which there may be an abnormality within the predetermined period based on a difference between the output vector data and the multi-dimensional vector data; and
output abnormality detection information including the identified time period.

2. The abnormality detection apparatus according to claim 1, wherein
the predetermined period is a time period in which a number of combinations of the one or more sensors and a measured time measured by the one or more sensors becomes the predetermined number.

3. The abnormality detection apparatus according to claim 1, wherein the at least one processor is further configured to execute the instructions to
convert the target data group into the multi-dimensional vector data including each data of a combination of the one or more sensors and a measured time measured by the sensor as a corresponding element.

4. The abnormality detection apparatus according to claim 1, wherein the at least one processor is further configured to execute the instructions to
compare the output vector data with the multi-dimensional vector data for each corresponding element and calculate the difference, and
identify a time period including a measured time when the difference exceeds a predetermined threshold.

5. The abnormality detection apparatus according to claim 1, wherein
the time series data includes data measured at a plurality of measured times measured by each of two or more sensors, and
wherein the at least one processor is further configured to execute the instructions to
further identify the sensor that may be a cause of the abnormality from among the two or more sensors based on the difference, and
include the identified time period with the identified sensor in association with each other in the abnormality detection information and output the abnormality detection information.

6. The abnormality detection apparatus according to claim 5, wherein
the self-encoder comprises:
an encoder including a plurality of sub-input layers corresponding to the two or more sensors, respectively; and
a decoder coupled to the encoder and includes a plurality of sub-output layers corresponding to the plurality of sub-input layers, respectively,
each of the plurality of sub-input layers includes each data corresponding to the plurality of measured times measured by the corresponding sensor as a corresponding element, and
each of the plurality of sub-output layers includes a same number of the elements as that of the elements of the sub-input layer.

7. The abnormality detection apparatus according to claim 1, wherein
the self-encoder includes an encoder which is a fully-connected neural network in which elements of the input layer are connected in a round robin fashion.

8. The abnormality detection apparatus according to claim 1, wherein the at least one processor is further configured to execute the instructions to
extract a second target data group of the predetermined period from second time series data measured by the one or more sensors when a measuring target is normal,
convert the second target data group into second multi-dimensional vector data, and
input the second multi-dimensional vector data to the input layers, learn a parameter of the self-encoder, and store the self-encoder as the learned self-encoder in the memory.

9. An abnormality detection method performed by a computer and comprising:
extracting, from time series data measured by one or more sensors during a first period of time, a target data group including a number of data pieces equal to a predetermined number of elements of a learned self-encoder, the target data group being for a predetermined period of time which is at least part of the first period, the elements being input layers of the learned self-encoder;
converting the target data group into multi-dimensional vector data having a number of elements equal to the predetermined number of elements of the learned self-encoder;
inputting the multi-dimensional vector data to the self-encoder to obtain output vector data having a number of elements equal to the predetermined number of elements of the learned self-encoder;

identifying a time period in which there may be an abnormality within the predetermined period based on a difference between the output vector data and the multi-dimensional vector data; and outputting abnormality detection information including the identified time period.

10. A non-transitory computer readable medium storing an abnormality detection program which causes a computer to execute:

extracting, from time series data measured by one or more sensors during a first period of time, a target data group including a number of data pieces equal to a predetermined number of elements of a learned self-encoder, the target data group being for a predetermined period of time which is at least part of the first period, the elements being input layers of the learned self-encoder;

converting the target data group into multi-dimensional vector data having a number of elements equal to the predetermined number of elements of the learned self-encoder;

inputting the multi-dimensional vector data to the self-encoder to obtain output vector data having a number of elements equal to the predetermined number of elements of the learned self-encoder;

identifying a time period in which there may be an abnormality within the predetermined period based on a difference between the output vector data and the multi-dimensional vector data; and outputting abnormality detection information including the identified time period.

\* \* \* \* \*